UNITED STATES PATENT OFFICE.

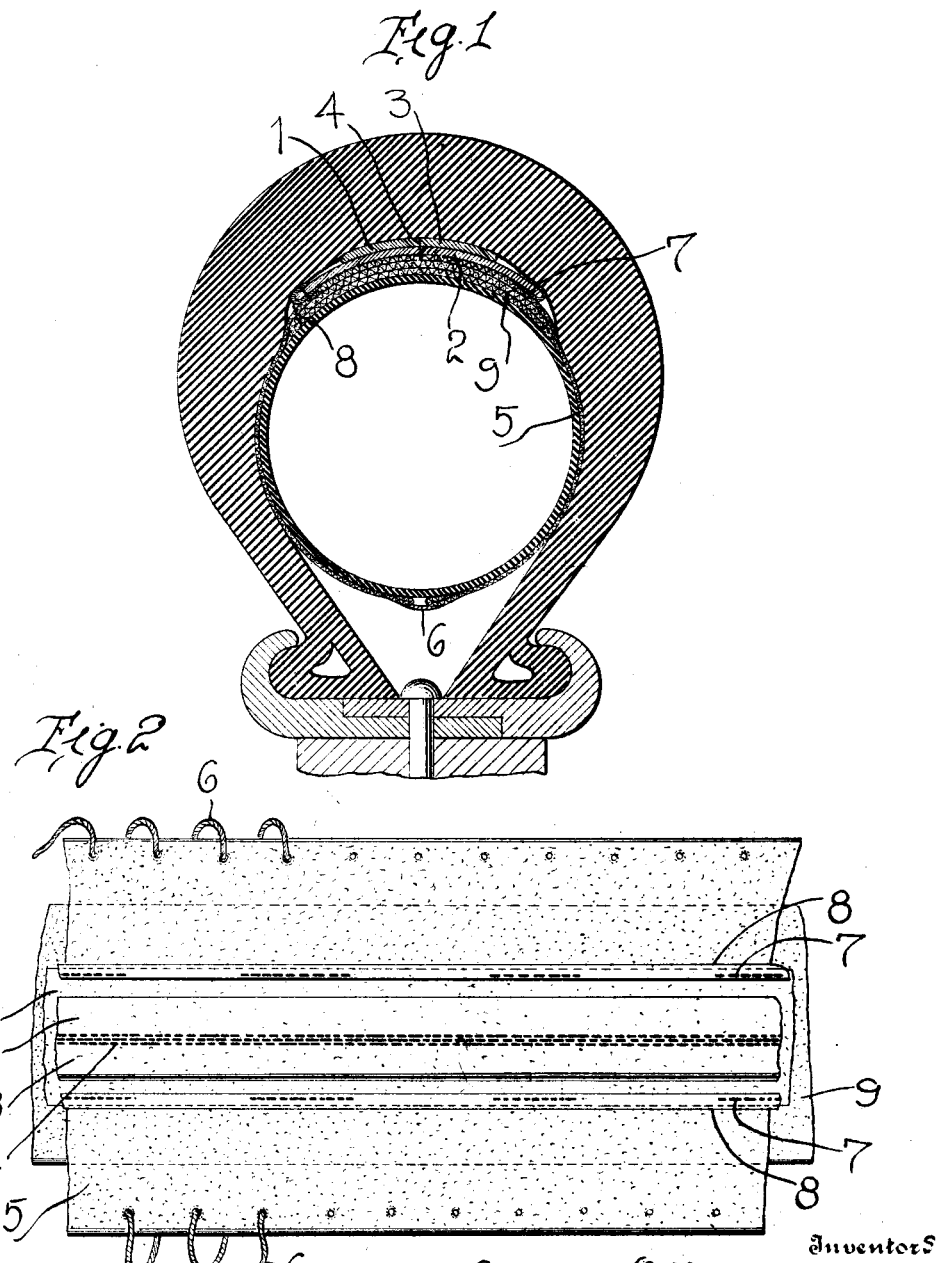

CHARLES O. MYERS AND HOWARD T. MARING, OF GETTYSBURG, PENNSYLVANIA.

PUNCTURE-PROOF AUTOMOBILE-TIRE SUPPORTER.

1,189,857.   Specification of Letters Patent.   Patented July 4, 1916.

Application filed November 9, 1914. Serial No. 871,141.

*To all whom it may concern:*

Be it known that we, CHARLES O. MYERS and HOWARD T. MARING, citizens of the United States, residing at Gettysburg, in the county of Adams and State of Pennsylvania, have invented certain new and useful Improvements in Puncture-Proof Automobile-Tire Supporters, of which the following is a specification.

This invention comprehends certain new and useful improvements in resilient tires for the wheels of automobiles and the like, and the primary object of the invention is to provide a simple, durable, and efficient construction of puncture-proof automobile tire supporter which can be easily inserted within the tire shoe or casing and interposed between the same and the inner tube, and which will effectually prevent the inner tube from becoming punctured, while at the same time it will tend to support the same and promote the resilience of the tire and insure the easy riding of the car.

A further object of the invention is a device of this character, the parts of which are constructed and arranged that the inner tube will not only be fully protected from punctures, but also from other injuries, and which will not detract from the resilience of the inner tube or tend to injure it in any way. And the invention also aims to generally improve automobile tires so as to render them more useful and commercially desirable.

With these and other objects in view, as will more fully appear as the description proceeds, the invention consists in certain constructions, arrangements and combinations of the parts that we shall hereinafter more fully describe and claim.

For a full understanding of the invention, reference is to be had to the following description and accompanying drawing, in which, Figure 1 is a transverse sectional view showing our device in position within a pneumatic tire, and Fig. 2 is a fragmentary outer face or plan view of the device detached.

Corresponding and like parts are referred to in the following description and designated in all of the views of the accompanying drawing by like reference characters.

Referring to the drawing, the numeral 1 designates an annular member which is designed to extend circumferentially around the tire and between the shoe or casing and the inner tube, as shown, said member being constructed in the present instance of an inner ply or section 2 and an outer ply or section 3 arranged in superposed and concentric relation to each other and secured together in any desired way. In the present instance, stitching 4 is used, the line of stitching extending medially of the two plies or sections, but it is to be understood that the invention is not limited thereto but that any desired or suitable means may be employed to secure the two plies together.

It will be noted that by having the plies or sections 2 and 3 united at medial points or more particularly at their transverse centers, the marginal portions thereof are capable of separating movement and this in practice is of material import as it will be at once perceived that in the event the outer ply or section 3 should be pierced, the penetrating article will be deflected by the inner ply or section 2, especially in view of the fact that the plies are capable of a certain degree of flexure as the same are preferably of sole leather which, as is well known, is very tough and which will render the tire practically puncture proof. These plies extend entirely around the tire, as above indicated, and are tapered at their ends where they are designed to overlap, whereby the entire device is of a uniform thickness throughout and the ends are permitted to give as the tire becomes more or less inflated.

It is to be understood that the annular member 1 is held within the tire by an attaching member 5 which may be formed of canvas or any other suitable substance or material and which may have its side edges secured together by lacing 6 or by any other desired means. The annular member 1 is secured to the attaching member 5 in any desired manner, stitching 7 being shown as employed in the present instance, and preferably, in order to avoid any sharp edges at the sides of the inner ply 2, said side edges preferably have secured thereto, by stitching or any other means, overlapping bindings 8 of soft leather or some other suitable substance.

In order to further protect the inner tube, the attaching member 5 has secured thereto by stitching or otherwise, an inner lining 9 of some relatively soft material such as cotton flannel, felt or the like, said lining being folded longitudinally to afford a plurality of superimposed plies of a transverse width in excess of the major transverse diameter of the annular member 1.

From the foregoing description in connection with the accompanying drawing, the operation of our improved puncture-proof automobile tire supporter will be apparent. In the practical use of the device, it is interposed between the inner tube and the outer shoe or casing, and is secured in place by the lacing 6, although it is to be understood that other means may be employed for this purpose, as hereinbefore stated. Thus, it will be understood that the tire will not only be well supported, but all liability of its becoming punctured will be positively precluded. It is to be particularly noted that no rivets or any other metal parts are embodied in the construction which would tend to tear or otherwise injure the delicate inner tube or the shoe, but that our improved device will not be liable to injure either the tube or shoe in any way.

While the accompanying drawing illustrates what we believe to be the preferred embodiment of our invention, it is to be understood that the invention is not limited thereto, but that various changes may be made in the construction, arrangement and proportions of the parts without departing from the scope of the invention as defined in the appended claims.

In the preferred mode of manufacture of our device, the leather is soaked and operated upon by a hydraulic or other heavy press.

What we claim, is:

1. An internal armor for pneumatic tires comprising an annular member embodying inner and outer concentric superposed plies, said plies being secured one to the other at substantially their transverse centers and in a circumferential direction, the portions of the plies at opposite sides of the connection being capable of relative separating movement.

2. An internal armor for pneumatic tires comprising an annular member embodying inner and outer concentric superposed plies, said plies being secured one to the other at substantially their transverse centers and in a circumferential direction, the portions of the plies at opposite sides of the connection being capable of relative separating movement, and means carried by the inner ply for maintaining the armor in applied position.

In testimony whereof we affix our signatures in presence of two witnesses.

CHARLES O. MYERS.
HOWARD T. MARING.

Witnesses:
D. W. GALL,
FREDERICK S. STITT.